US005086306A

United States Patent [19]

Sasaki

[11] Patent Number: 5,086,306

[45] Date of Patent: Feb. 4, 1992

[54] LINE HEAD DRIVING APPARATUS

[75] Inventor: Eiichi Sasaki, Yokohama, Japan

[73] Assignee: Ricoh Company, Ltd., Tokyo, Japan

[21] Appl. No.: 548,102

[22] Filed: Jul. 5, 1990

[30] Foreign Application Priority Data

Jul. 19, 1989 [JP] Japan ........ 1-187151
May 25, 1990 [JP] Japan ........ 2-136099

[51] Int. Cl.[5] ........ G01D 15/10; B41J 2/36
[52] U.S. Cl. ........ 346/76 PH; 400/120; 358/298
[58] Field of Search ........ 358/298; 346/76 PH; 400/120

[56] References Cited

U.S. PATENT DOCUMENTS 4,679,055 7/1987 Inui et al. ........ 346/76 PH
4,688,051 8/1987 Kawakami et al. ........ 346/76 PH
5,006,866 4/1991 Someya ........ 346/76 PH

FOREIGN PATENT DOCUMENTS 131262 7/1985 Japan .

*Primary Examiner*—Benjamin R. Fuller
*Assistant Examiner*—Huan Tran
*Attorney, Agent, or Firm*—Cooper & Dunham

[57] ABSTRACT

A line head driving apparatus includes a correcting circuit which sets an electrical energy level to be applied to thermal elements to be greater than that indicated by multilevel image data supplied from a preprocessing circuit when a series of multilevel image data indicates an increase in an image density in a sub scan direction perpendicular to the main scan direction. On the other hand, the correcting circuit sets the electrical energy level to be applied to the thermal elements to be less than that indicated by the image data supplied from the preprocessing circuit when the series of multilevel image data indicates a decrease in the image density in the sub scan direction. The line head driving apparatus also includes a head driving circuit which drives the thermal elements in accordance with the electrical energy level set by the correcting circuit.

16 Claims, 10 Drawing Sheets

LINE HEAD DRIVING APPARATUS

BACKGROUND OF THE INVENTION

The present invention generally relates to a line head driving apparatus, which is applied to, for example, a thermal printing device.

A line head driving apparatus is used in a thermal printing device, a display device or the like. A line head has a plurality of thermal elements, which are arranged into a line. The thermal elements are driven in accordance with image data so that dot images are formed on a recording sheet or a display device.

As is known, a thermal head is a line head. A conventional thermal head has a layer structure in which a ceramic layer, a glaze layer and a resistance layer are laminated in this order on a heat sinking plate. The resistance layer is electrically driven via an electrode so that it emits heat. An ink sheet located in the vicinity of the resistance layer is heated by the resistance layer being driven so that a dot is recorded on a recording sheet through the ink sheet. Alternatively, a heat sensitive sheet is directly heated by the resistance layer so that a dot is recorded thereon.

Heat generated by the heat element being driven is, on the other hand, accumulated in the ceramic layer between the glaze layer and the heat sinking plate. Each thermal element is affected by its peripheral thermal elements as well as a past profile which shows how each thermal element was driven in the past. Thus, the heat storage states of the thermal elements are different from each other. It will be noted that the density of dot varies in accordance with a variation in the heat storage state of each heat element.

There is known a line head driving apparatus which is directed to overcoming the above-mentioned problems (see Japanese Laid-Open Patent Application No. 60-131262). The line head driving apparatus disclosed in the Japanese application drives the heat elements arranged into a line, as shown in FIG. 1. Referring to FIG. 1, $D_0$ indicates a dot of interest. The heat storage state of the thermal element corresponding to the dot $D_0$ is determined on the basis of binary image data which are applied to the thermal elements which form peripheral dots $D_1$–$D_{21}$. Dots $D_1$–$D_4$ are located in the same line as the dot $D_0$. The dots $D_9$, $D_{15}$, $D_{20}$ and $D_{21}$ lead the dot $D_0$ by one to five lines. The dots $D_5$–$D_7$, $D_9$–$D_{11}$, $D_{12}$–$D_{14}$ and $D_{16}$–$D_{18}$ lead the dot $D_0$ of interest by one or two lines. Binary data applied to the thermal elements related to the dots $D_1$–$D_{21}$ are weighted in accordance with the positions thereof with respect to the dot $D_0$. The heat storage state of the thermal element corresponding to the dot $D_O$ is calculated from weighted binary data. Binary data applied to the thermal element corresponding to the dot $D_0$, that is, the amount of heat generated thereby, is compensated on the basis of the calculated heat storage state.

As described above, the heat storage state of the thermal element of interest is obtained from binary data related to the 21 peripheral dots $D_1$–$D_{21}$. It will be noted that each thermal element is supplied with binary data, which indicates whether the corresponding dot is white or black. In this case, the procedure for calculating the heat storage state is not much complex. However, in a case where multilevel image data is applied to each thermal element, the heat storage state calculation procedure is very complex and a large amount of data must be processed in order to obtain the heat storage state of the thermal element of interest by referring to the image data related to the peripheral dots. Further, the line head driving apparatus disclosed in the aforementioned Japanese application encounters a problem illustrated in FIGS. 2 and 3. When a totally filled area 10*c* is printed on a sheet, the density of a front portion 10*a* thereof (which amounts to, for example, about 200 lines) increases gradually, and the density of an end portion thereof decreases gradually. This phenomenon is caused by the heat storage function of the thermal elements. As a result, the image quality of the totally filled area 10*c* is deteriorated.

SUMMARY OF THE INVENTION

It is a general object of the present invention to provide an improved line head driving apparatus in which the above-mentioned disadvantages of the prior art are eliminated.

A more specific object of the present invention is to provide a line head driving apparatus capable of compensating for variations in density of dots caused by the heat storage function of the thermal elements.

The above-mentioned objects of the present invention are achieved by a line head driving apparatus for receiving a series of multilevel image data from a preprocessing circuit and driving a line head having a plurality of thermal elements arranged into a line in a main scan direction on the basis of the multilevel image data, each of the thermal elements corresponding to one dot of an image, the line head driving apparatus comprising:

correcting means for setting an electrical energy level to be applied to the thermal elements to be greater than that indicated by the multilevel image data supplied from the preprocessing circuit when the series of multilevel image data indicates an increase in an image density in a sub scan direction perpendicular to the main scan direction and for setting the electrical energy level to be applied to the thermal elements to be less than that indicated by the multilevel image data supplied from the preprocessing circuit when the series of multilevel image data indicates a decrease in the image density in the sub scan direction; and head driving means, coupled to the correcting means, for driving the thermal elements in accordance with the electrical energy level set by the correcting means.

BRIEF DESCRIPTION OF THE DRAWINGS

Other objects, features and advantages of the present invention will become apparent from the following detailed description when read in conjunction with the accompanying drawings, in which.

DESCRIPTION OF THE PREFERRED EMBODIMENTS

Figure 4:
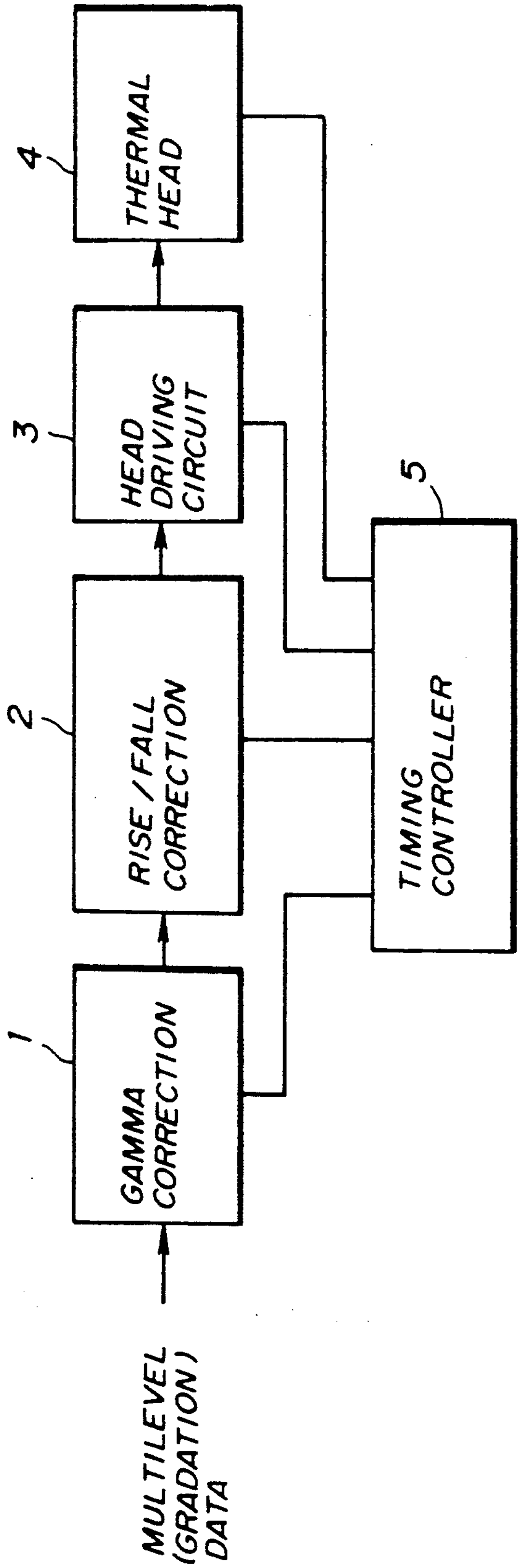
FIG. 4 is a block diagram of a line head driving apparatus according to a preferred embodiment of the present invention.
Figure 12:
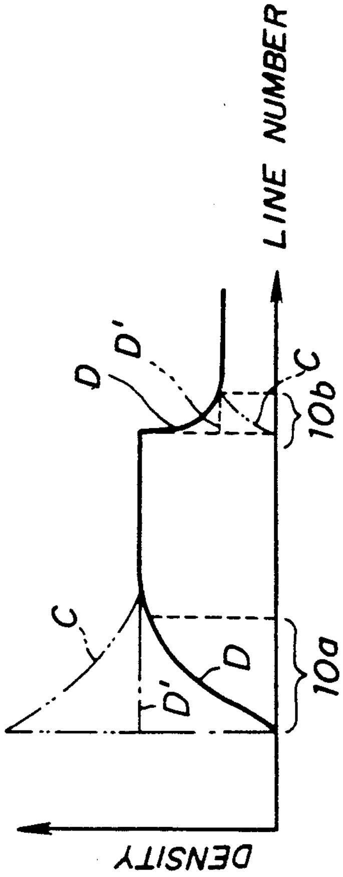
FIG. 12 is a diagram illustrating how the image density is corrected by the rise/fall correction circuit.

A description will now be given of a line head driving apparatus for use in a printing machine, a facsimile machine, a copying machine or the like. The line head driving apparatus shown in FIG. 4 is composed of a gamma correction (preprocessing) circuit 1, a rise/fall correction circuit 2, a head driving circuit 3 and a timing controller 5. Image data is input to the gamma correction circuit 1. Image data indicates a number of pulses corresponding to a density of a dot to be recorded. As is well known, the relationship between the number of pulses of image data and the density of recorded dot is non-linear. The gamma correction circuit 1 corrects the image data (pulse number data corresponding to an electrical energy level applied to the corresponding thermal element) so that the above-mentioned relationship becomes linear. Corrected pulse number data produced and output by the gamma correction circuit 1 is input to the rise/fall correction circuit 2. The rise/fall correction circuit 2 corrects the pulse number data so that the density of the totally filled area 10c changes, as shown by the one-dot chain line D' shown in FIG. 12. The configuration of the rise/fall correction circuit 2 will be described in detail later. The head driving circuit 3 receives corrected pulse number data produced and output by the rise/fall correction circuit 2 and drives a thermal head 4 so that dot images are recorded on a recording sheet for every line.

Figure 5:
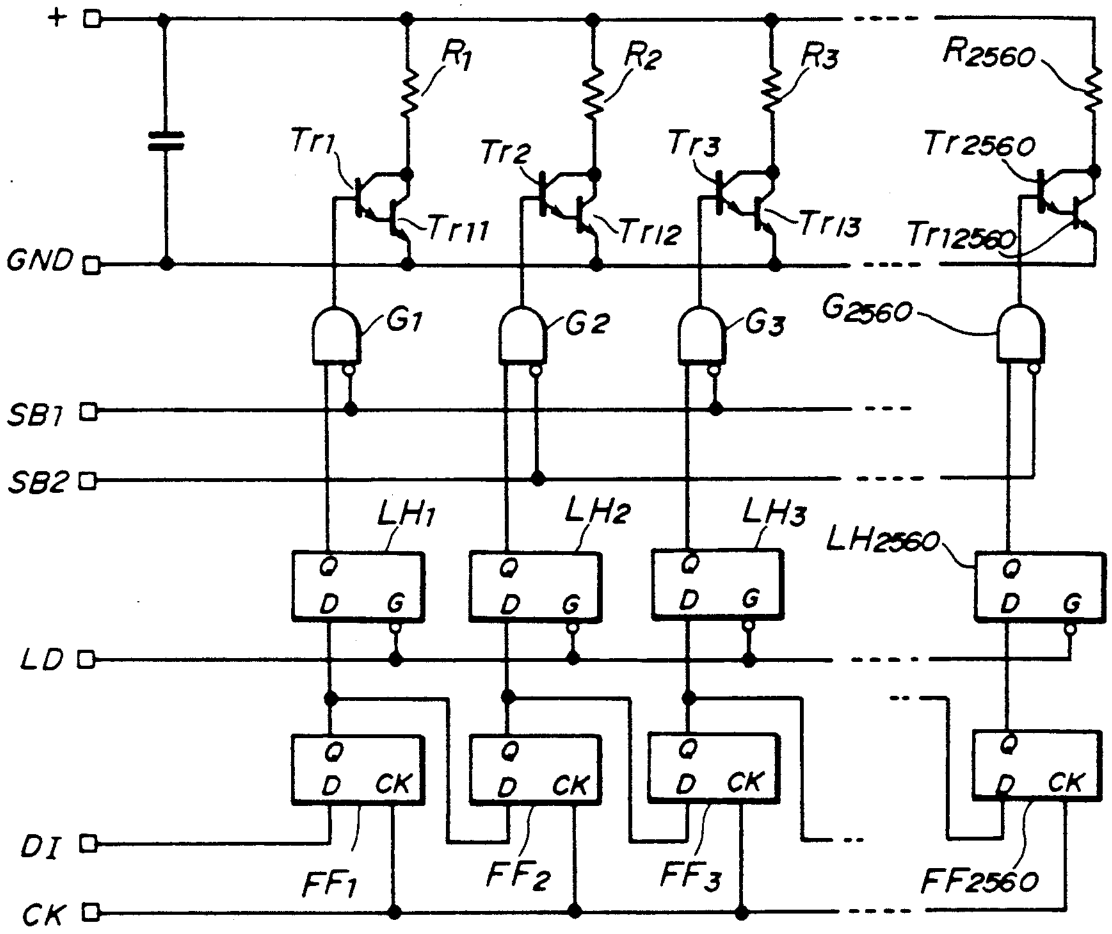
FIG. 5 is a circuit diagram of a line head shown in FIG. 4.

FIG. 5 is a circuit diagram of the thermal head 4. The configuration shown in FIG. 5 is applied to a sublimation type thermal printer. The thermal head 4 is composed of a plurality of thermal elements R1–R2560, which are formed of thermal resistors. Each of the thermal elements has a ceramic layer, a glaze layer and a resistance layer which are laminated, in this order, on a common heat sinking plate. An electrode is formed on each resistance layer. The thermal elements R1–R2560 are aligned in a main scan direction. The recording sheet is moved in a sub scan direction perpendicular to the main scan direction.

The thermal head 4 shown in FIG. 5 includes a driver circuit, which is composed of the following elements. Shift registers formed of flip-flops FF1–FF2560 sequentially receive pulse number data DI amounting to one line in synchronism with a clock CK. In synchronism with a latch signal LD, latch circuits LH1–LH2560 latch the pulse number data which amount to one line and which are respectively output by the flip-flops FF1–FF2560. The thermal elements R1–R2560 are grouped into odd-numbered thermal elements and even-numbered thermal elements. Q-output terminals of the latch circuits LH1–LH2560 are connected to gates G1–G2560, respectively. The gates G1, G3, . . . , G2559 related to the odd-numbered latch circuits LH1, LH3, . . . , LH2559 are supplied with a first strobe pulse SB1. On the other hand, the gates G2, G4, . . . , G2560 related to the even-numbered latch circuits LH2, LH4, . . . , LH2560 are supplied with a second strobe pulse SB2. Transistors Tr1, Tr2, . . . , Tr2560 are provided respectively for the thermal elements R1–R2560. Similarly, transistors Tr11, Tr12, . . . , Tr12560 are also provided respectively for the thermal elements R1–R2560. The output terminals of the gates G1–G2560 are connected to the bases of the transistors Tr1–Tr2560, respectively. When the first strobe signal SB1 is ON, the output signals from the odd-numbered latch circuits LH1, LH3, . . . , LH2559 are respectively applied to the bases of the transistors Tr1, Tr3, . . . , Tr2559 through the gates G1, G3, . . . , G2559. When the second strobe signal SB2 is ON, the output signals from the even-numbered latch circuits LH2, LH4, . . . , are applied respectively to the bases of the transistors Tr2, Tr4, . . . , Tr2560. When the transistors Tr1, Tr2, . . . , Tr2560 are turned ON, the transistors Tr11, Tr12, . . . , Tr12560 are turned ON. As described previously, the transistors Tr1, Tr2, . . . , Tr2560 are turned ON in accordance with the pulse number data DI. When the transistors Tr1, Tr2, . . . , Tr2560 are ON, currents respectively pass through the thermal elements R1, R2, . . . , R2560 from a D.C. positive power source (+) to ground (GND). An ink sheet or a heat-sensitive heat is heated by the thermal elements which are ON, so that dot images amounting to one line are printed on the recording sheet at one time.

Figure 6:
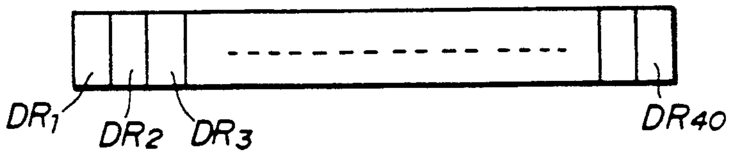
FIG. 6 is a diagram illustrating the arrangement of driver circuits included in the line head.

FIG. 6 illustrates an arrangement of the driver circuit of the thermal head 4. As has been described previously, the driver circuit includes the flip-flops FF1–FF2560, the latch circuits LH1–LH2560, the gates G1–G2560, and the transistors Tr1–Tr2560 and Tr11–Tr12560. The driver circuit is divided into 40 driver chips DR1–DR40, each of which processes 64 bits.

Figure 7:
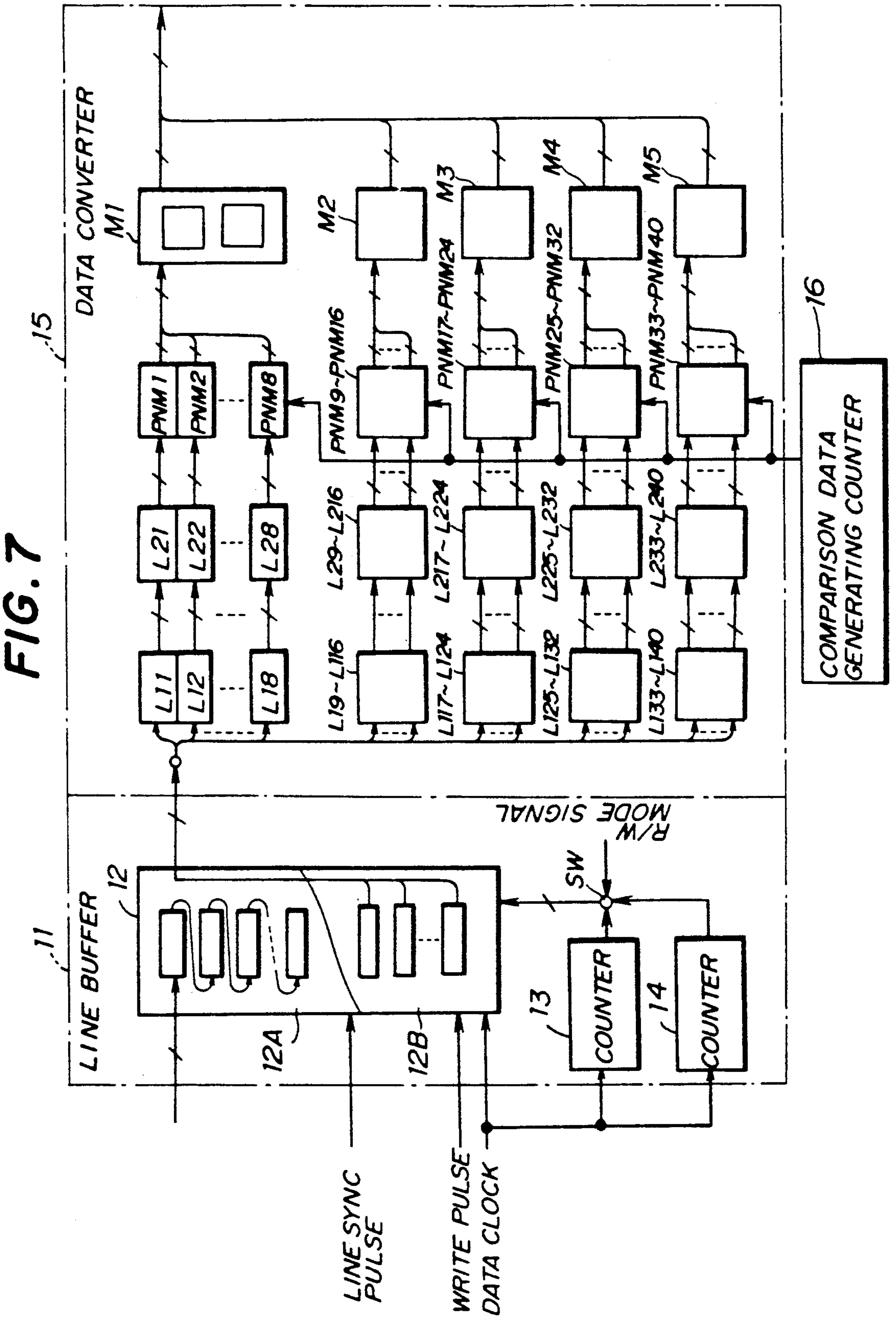
FIG. 7 is a block diagram of a head driving circuit shown in FIG. 4.

FIG. 7 is a circuit diagram of the head driving circuit 3 shown in FIG. 4. As shown in FIG. 7, the head driving circuit 3 is composed of a line buffer 11, a data converter 15 and a comparison data generating counter 16.

The line buffer 11 is composed of a line memory 12, and counters 13 and 14. The line memory 12 is divided into two storage areas 12A and 12B, each of which has a storage capacity of 4 Kbytes, for example. The counter 13 functions as a write counter, and the counter 14 functions as a read counter. Each of the counters 13 and 14 assumes an initial value of 2559, and decrements the counter value by one each time pulse number data is written into or read out from the line memory 12. Each block illustrated in the line memory 12 block corresponds to one line. Multilevel image (pulse number) data amounting to one line are sequentially transferred to the one-line storage areas, as indicated by arrows in FIG. 7. The output signals of the counters 13 and 14 are input to a switch SW, which alternately selects one of the two counter output signals in accordance with a read/write (R/W) mode signal.

Figure 8:
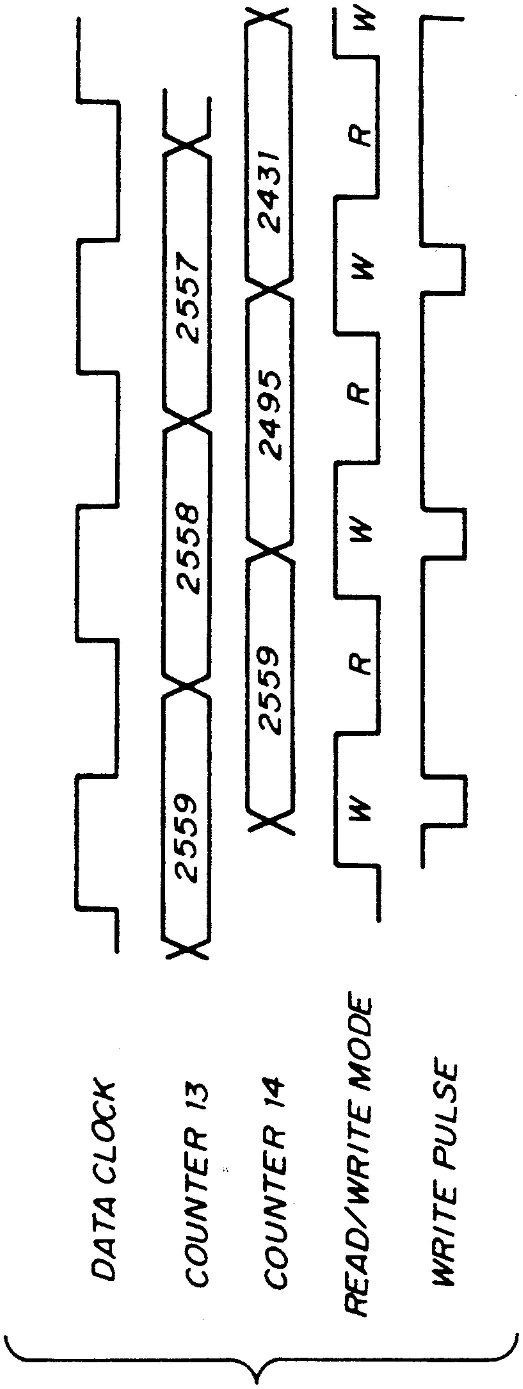
FIG. 8 is a waveform diagram illustrating the operation of the head driving circuit shown in FIG. 7.

As shown in FIG. 8, a data clock and a write pulse are applied to the line memory 12. Multilevel image data which are successively output for every bit from the rise/fall correction circuit 2 in synchronism with the data clock, is written into the line memory 12 in accordance with the counter value in the write counter 13 and the write pulse. During the write operation, the write counter is decremented one by one in synchronism with the data clock, starting from an address, 2559. The switch SW is changed in accordance with the R/W mode signal, as shown in FIG. 8. During the readout operation, multilevel image data is read out from the line memory 12 for every 64 bits (addresses), such as 2559, 2495, . . . , 63, 2558, 2494, . . . , 62, . . . , 0. This readout operation is due to the fact that each of the 40 driver chips DR1–DR40 processes 64 bits.

The data converter 15 is composed of a first group of latch circuits L11–L140, a second group of latch circuits L21–L240, pulse number module (PNM) circuits (formed of magnitude comparators) PNM1–PNM40 and head memories M1–M5. 40 image data which are read out from the line memory 12 in accordance with addresses, 2559, 2495, . . . , 63, are written into the first group of latch circuits L11–L140. On the other hand, the contents of the latch circuits L11–L140 are latched by the second group of latch circuits L21–L240.

The image data in the latch circuits L21–L240 are compared with comparison data (threshold level), '0' (gradation level '0') by the magnitude comparators PNM1–PNM40. Each of the magnitude comparators PNM1–PNM40 outputs binary one ('1'), when the corresponding image data is greater than the comparison data, '0'. On the other hand, each of the magnitude comparators PNM1–PNM40 outputs binary zero ('0') when the corresponding image data is equal to or less than comparison data, '0'. The binary output signals of the magnitude comparators PNM1–PNM40 are written into the head memories M1–M5. For example, the binary output signals of the magnitude comparators PNM1–PNM8 are written into the head memory M1.

After that, the comparison data generated by the comparison data generating counter 16 is incremented by one so that it outputs comparison data, '1'. The second group of latch circuits L21–L240 outputs the same image data, which are compared with comparison data, '1' by the magnitude comparators PNM1–PNM40. Each of the magnitude comparators PNM1–PNM40 outputs binary one ('1'), when the corresponding image data is greater than comparison data, '1'. On the other hand, each of the magnitude comparators PNM1–PNM40 outputs binary zero ('0') when the corresponding image data is equal to or less than comparison data, '1'.

In the same way, the comparison data generated by the comparison data generating counter 16 is incremented one by one up to 255, such as '3', '4', . . . , '255', and is compared with each of the image data in the latch circuits L21–L240. With this arrangement, the image data in the latch circuits L21–L240 are individually converted into 256-multilevel image data and then written into the head memories M1–M5.

Six high-order bits of the 40 bits output by the head memories M1–M5 indicate a dot number which specifies one of the dots, and eight low-order bits thereof indicate a level number which specifies one of the 256 gradation levels. During the above-mentioned operation, the address comprised of 40 bits has dot number, '0', and the level number contained in the address varies between '0' and '255', depending on the comparison data generated and output by the comparison data generating counter 16.

During the above-mentioned comparison operation, 40 image data are read out from the line memory 12 in accordance with addresses, 2558, 2494, . . . , 62 and written into the first group of latch circuits L11–L140. Then, the readout image data are maintained in the latch circuits L11–L140 until the comparison operation is completed. At the same time as the comparison operation is completed, the contents of the latch circuits L11–L140 are latched by the second group of latch circuits L21–L240. Then, the dot number is changed to '1' and the comparison operation is carried out so that the image data in the latch circuits L21–L240 is converted into 256-multilevel image data and written into the head memories M1–M5.

In the same way, 40 image data are read out from the line memory 12 and converted into 256-multilevel image data, which are then written into the head memories M1–M5. Each time 40 image data are processed, the dot number is incremented by one. In this way, the dot number is altered from '0' to '63'.

In synchronism with the head latch signal LD (FIG. 5), image data related to level number '0' and dot numbers '0'–'63' is read out from the head memories M1–M5, and sent, as image data DI, to the thermal head 4. Next, image data related to level number '1' and dot numbers '0'–'63' is read out from the head memories M1–M5, and sent, as image data DI, to the thermal head 4. Then, image data related to level number '2' and dot numbers '0'–'63' is read out from the head memories M1–M5. In the same way, image data level numbers '3'–'255' and dot numbers '0'–'63 ' are successively read out, and sent, as image data DI, to the thermal head 4.

Figure 9:
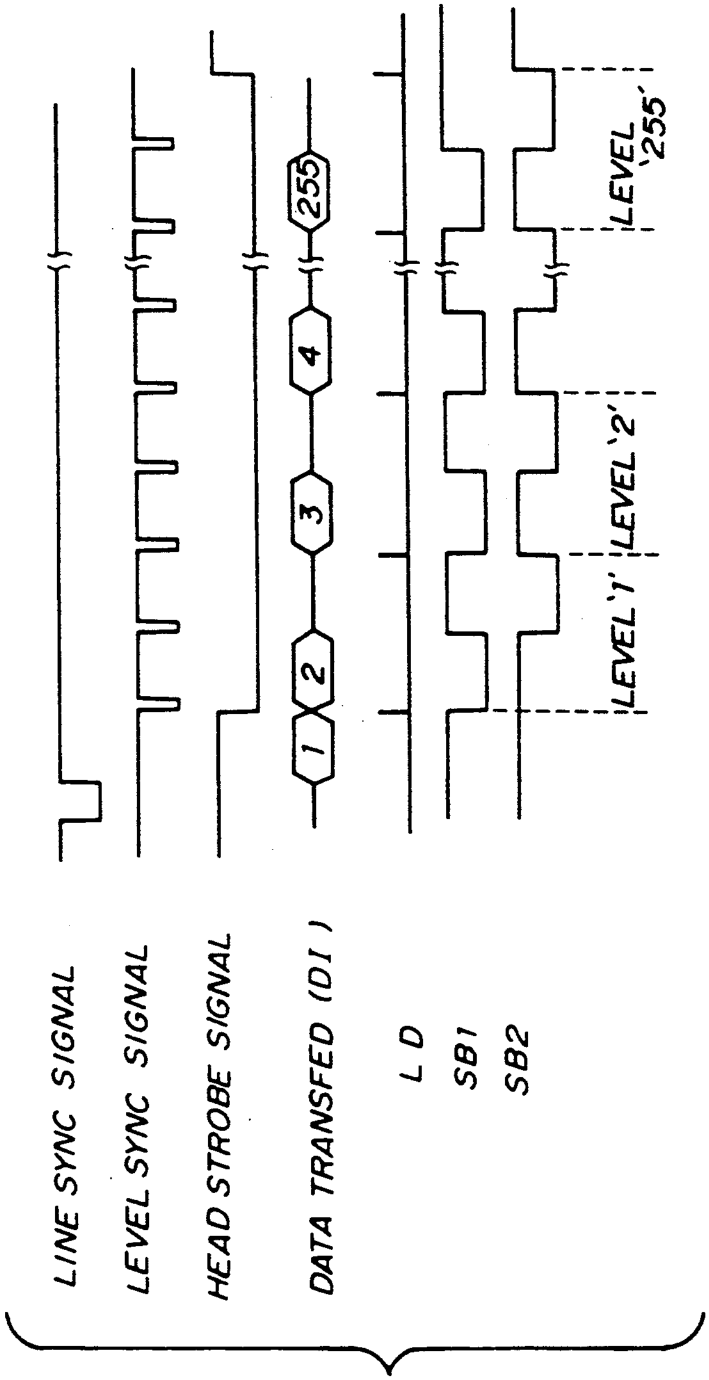
FIG. 9 is a waveform diagram illustrating the operation of the line head shown in FIG. 5.
Figure 10:
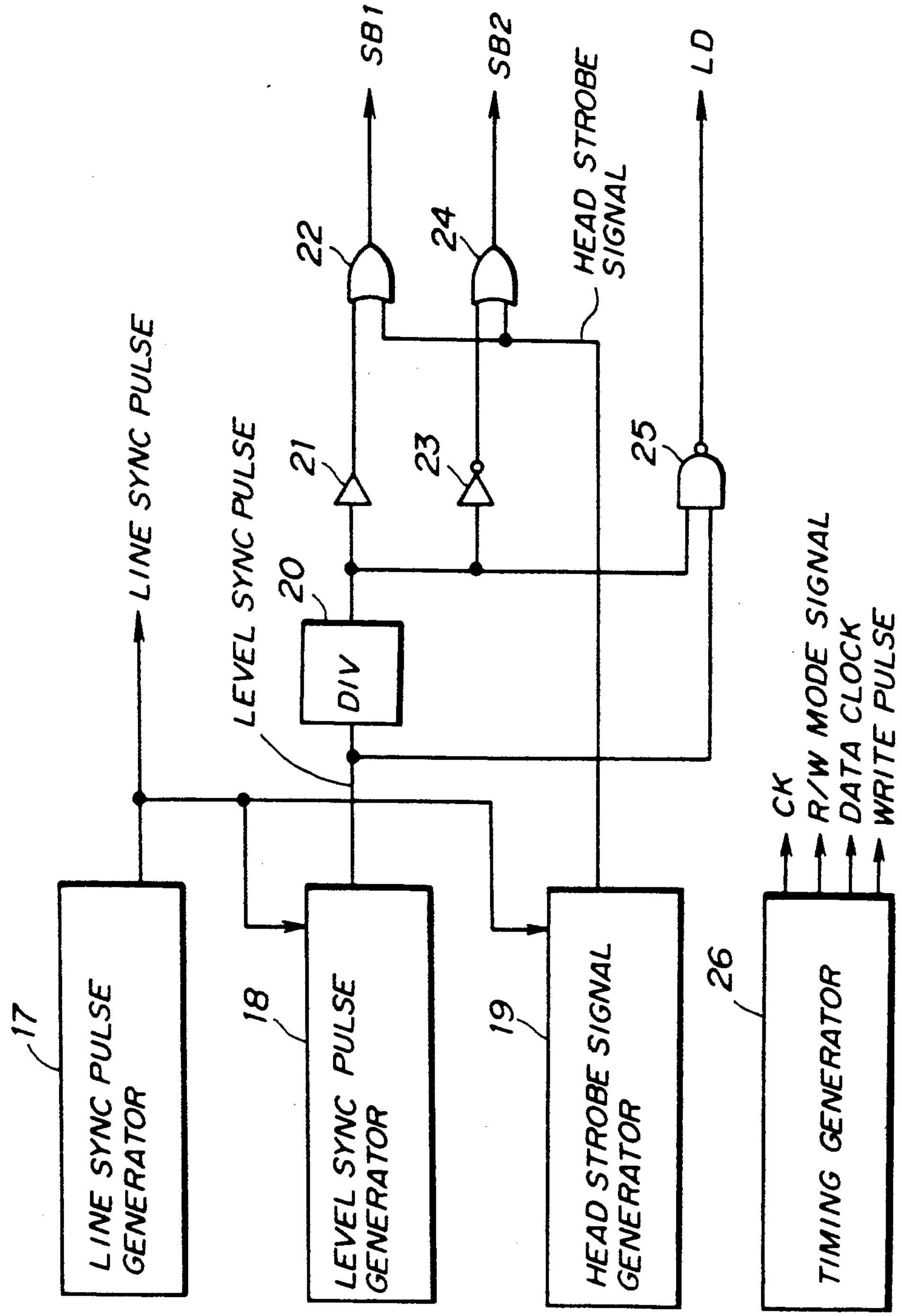
FIG. 10 is a circuit diagram of a timing generator shown in FIG. 4.

FIG. 9 is a waveform diagram illustrating the above-mentioned operation. The signals shown in FIG. 9 are generated by the timing controller 5 having an arrangement shown in FIG. 10. A line synchronizing pulse 17 generates a line synchronizing pulse. A level synchronizing pulse generator 18 generates a level synchronizing pulse, which has a period corresponding time t, during which time the thermal elements R1–R2560 are conducted. The level synchronizing pulse generator 18 is reset in response to the line synchronizing pulse. A head strobe signal generator 19 generates a head strobe signal, which is maintained at a low level during the time when 256-multilevel image data is read out from the head memories M1–M5. The head storage signal generator 19 is reset in synchronism with the line synchronizing pulse.

The level synchronizing pulse is frequency-divided by a 2-frequency divider 20 so that a pulse having a frequency half that of the level synchronizing pulse is generated. The pulse generated and output by the frequency divider 20 is respectively applied to OR gates 22 and 24 through a buffer 21 and an inverter 23, respectively. The OR gates 22 and 24 are supplied with the head strobe signal generated and output by the head strobe signal generator 19. The output signal from the OR gate 22 is the aforementioned first strobe signal SB1, and the output signal from the OR gate 24 is the aforementioned second strobe signal SB2. A NAND circuit 25 receives the level synchronizing pulse generated and output by the level synchronizing pulse generator 18 and the pulse from the frequency divider 20. The output signal of the NAND gate 25 functions as the aforementioned head latch signal LD. A timing generator 26 generates the clock signal CK, the R/W mode signal, the data clock and write pulse.

Figure 11:
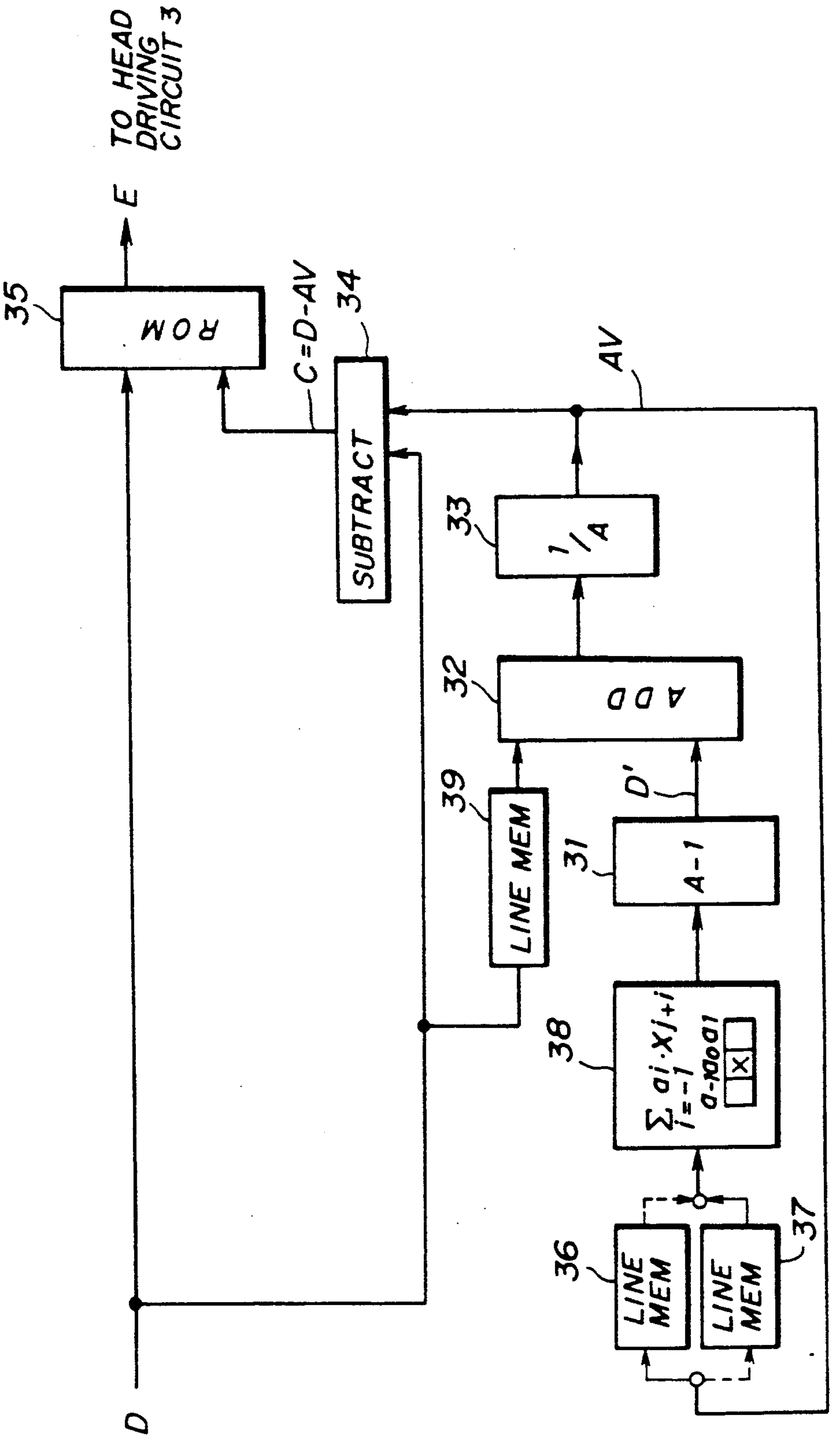
FIG. 11 is a block diagram of an arrangement of a rise/fall correction circuit shown in FIG. 4.

FIG. 11 is a block diagram of the rise/fall correction circuit 2 shown in FIG. 4. The pulse number data (image data) D supplied from the gamma correction circuit 1 is input to a line memory 39, which delays the pulse number data D by a delay of time equal to one line. The pulse number data output from the line memory 39 is input to an adder 32, which adds the same to data D′ output by an $(A-1)$ multiplier 31. A divider 33 multiplies the output from the adder 32 by 1/A where A is a predetermined constant. For example, A=100, which corresponds to 100 lines in the sub scan direction. An output AV of the divider 33 corresponds to the average of the values of A image data (100 image data, for example). The divider 33 is formed of, for example, a read only memory. The output signal of the adder 32 functions as an address of the ROM divider 33, which stores a plurality of data AV for different address values. The data AV output from the divider 33 is input to a subtracter 34, which subtracts the data AV from the pulse number data D from the gamma correction circuit 1 and which outputs correction data C (=D−AV).

Figure 1:
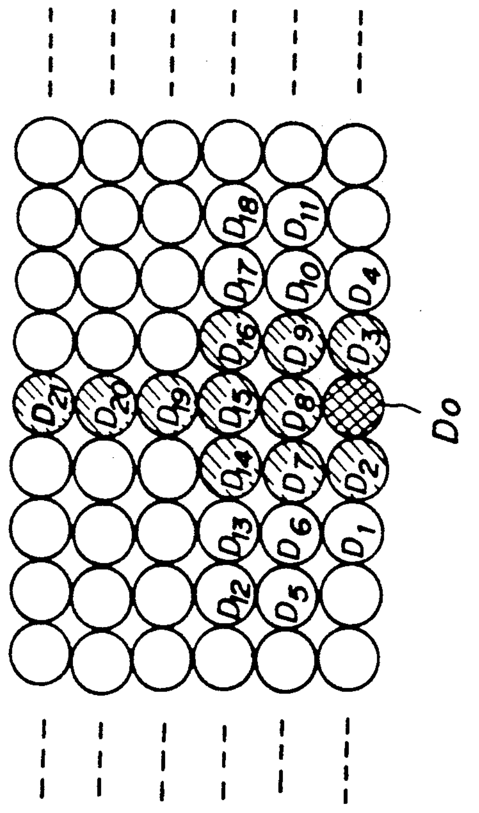
FIG. 1 PRIOR ART
FIG. 1 is a diagram illustrating how to drive a thermal element by a conventional line head driving apparatus.
Figure 2:
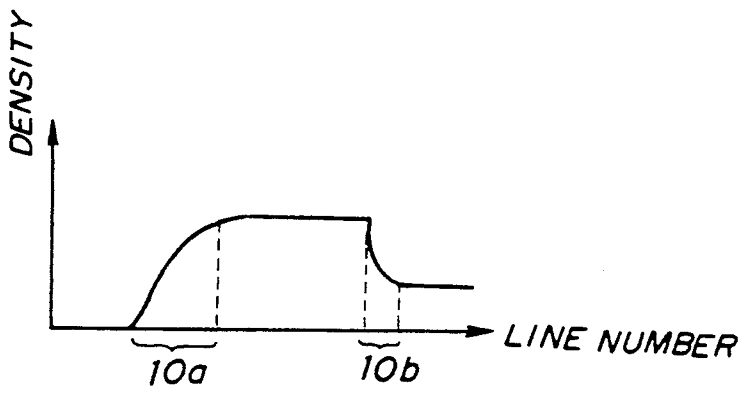
FIG. 2 PRIOR ART
FIGS. 2 and 3 are diagrams illustrating the problems encountered in the conventional line head driving apparatus.
Figure 3:
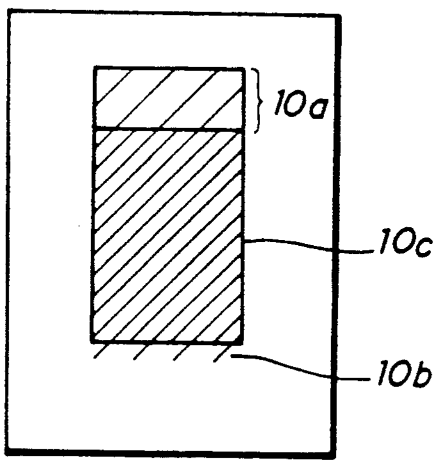
FIG. 3 PRIOR ART

The data C and D are input to a ROM 35, which has a table defined by the data C and D. The table in the ROM 35 has a plurality of areas which are accessed by the data C and D. Each of the areas stores corrected pulse number data which can realize the density shown in the one-dot chain line in FIG. 12. The solid-line curve shown in FIG. 12 corresponding to the pulse number data D is compensated on the basis of the data D so that the corrected pulse number data corresponding to the one-dot chain line D′ can be obtained. It will be noted that the data C (indicated by the two-dot chain line in FIG. 12) functions to increase the density, as shown by the curve C, when the pulse number data D corresponds to the front portion 10*a* of the totally filled area 10*c* (FIG. 3). On the other hand, the data C functions to decrease the density, as shown by the curve C, when the image data corresponds to the rear portion 10*b* of the totally filled area 10*c*. ROM 35 outputs corrected pulse number data E, which is equal to D−FC where F is a predetermined constant. That is, the pulse number data D is compensated so that variations in the density due to the heat storage states of the thermal elements are cancelled.

Line memories 36 and 37 are alternately supplied with the data AV for every line. When the data AV is being written into one of the line memories 36 and 37, the data AV is being read out from the other one of the line memories 36 and 37. By this alternate switching operation of the line memories 36 and 37, data $X_j$ positioned one line prior to the line of the pulse number data D and data $X_{j-1}$ and $X_{j+1}$ which are adjacent to the data $X_j$ and located in the same line as the data $X_j$ are read out therefrom. The data $X_{j-1}$, $X_j$ and $X_{j+1}$ are input to a calculation circuit 38, which multiplies $X_{j-1}$, $X_j$ and $X_{j+1}$ by weighting factors $a_{-1}$, $a_0$ and $a_{+1}$, respectively. That is, the calculation circuit 38 calculates the following formula:

$$\sum_{i=-1}^{+1} a_i \cdot X_{j+i}$$

where $$\sum_{i=-1}^{+1} a_i = 1.$$

Data output from the calculation circuit 38 is input to the multiplier 31, which multiplies the input data by A−1. The adder 32 adds image data related to one dot and image data related to (A−1) lines, and outputs image data related to A lines. The image data output from the adder 32 is divided by A so that the divider 33 outputs the average of the image data related to A lines.

The calculation circuit 38 calculates the heat storage states of the thermal elements which are located in the previous lines with respect to the line of interest. That is, the calculation result output by the calculation circuit 38 indicates the heat storage state of a fan-shaped area, the apex of which corresponds to the thermal element being considered.

It is now assumed that a series of pulse number data D indicating level '0' is successively applied to the ROM 35. In this case, data AV indicates level '0', which means that the average level over A (100 lines, for example) is '0'. It is now assumed the pulse number data D is changed from level '0' to level '150'. Level '150' is input to the ROM 35 and the subtracter 34. At this time, the subtracter 34 is supplied with level '0' sent from the driver 33. Thus, the subtracter 34 outputs data C which indicates level '150'. The ROM 35 receives the data D indicating level '150' and the data C indicating level '150', and outputs data having a corresponding value (level '250', for example). It will be noted that if the data D and C are simply added, the data D will be excessively corrected.

If a series of pulse number data D indicating level '150' is successively applied to the ROM 35, the value of the data AV output by the divider 33 gradually increases and thus the value of the data C output by the subtracter 34 gradually decreases. As a result, the value of the data E gradually decreases and becomes approximately equal to level '150', as shown by the curve C in FIG. 12.

It is now assumed that the pulse number data D is changed from level '150' to level '50'. This image data is applied to the ROM 35 and the subtracter 34. On the other hand, the data AV output by the divider 33 indicates level '150'. Thus, the data C indicates level '−100'. The ROM 35 outputs the data E indicating a level (level '10', for example) corresponding to level '50' of the pulse number data D and level '−100'. If a series of pulse number data D indicating level '50' is successively applied to the ROM 35, the value of the data C gradually increases and then becomes approximately equal to zero, as shown by the curve C in FIG. 12.

Figure 13:
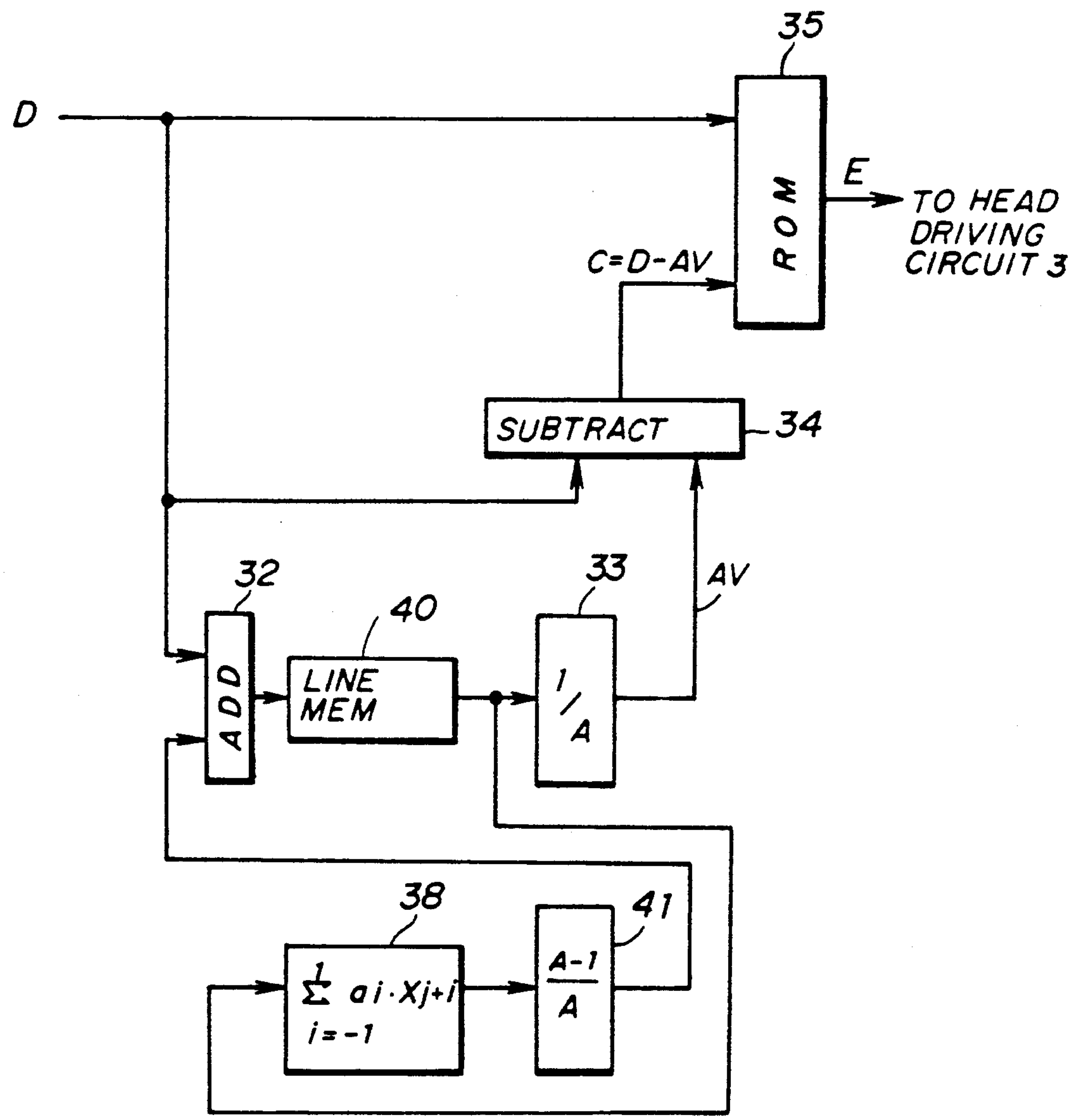
FIG. 13 is a block diagram of another arrangement of the rise/fall correction circuit shown in FIG. 4.

A description is given of the rise/fall correction circuit 2 (FIG. 4) according to a second embodiment of the present invention with reference to FIG. 13. In FIG. 13, those parts which are the same as those shown in FIG. 11 are given the same reference numerals. The pulse number data D output by the gamma correction circuit 1 (FIG. 4) is applied to the ROM 35 and the adder 32, which adds the pulse number data D and an output signal from an (A−1)/A multiplier 41. The addition result produced and output by the adder 32 is written into a line memory 40. Data $X_j$ related to the line which leads the line of interest by one line and data $X_{j-1}$ and $X_{j+1}$ adjacent to data $X_j$ in the sub scan direction are read out from the line memory 40, and input to the 1/A multiplier 33 and the calculation circuit 38. That is, the addition result output by the adder 32 is delayed by a time equal to one line, and then supplied to the divider 33. The multiplier 33 outputs data AV which is the same as that output by the multiplier 33 shown in FIG. 11. The data AV is input to the subtracter 34, to which the pulse number data D is input. The subtracter 34 outputs data C (=D−AV). The ROM 35 operates in the same way as the ROM 35 shown in FIG. 11. The corrected pulse number data (corrected electrical energy level) E is applied to the head driving circuit 3 (FIG. 4). It should be noted that the arrangement shown in FIG. 13 use only one line memory 40 and is thus simpler than that shown in FIG. 11.

The present invention is not limited to the specifically disclosed embodiments, and variations and modifications may be made without departing from the scope of the present invention.

What is claimed is:

1. A line head driving apparatus for receiving a series of multilevel image data from a preprocessing circuit and driving a line head having a plurality of thermal elements arranged into a line in a main scan direction on a basis of said multilevel image data, each of said thermal elements corresponding to one dot of an image, said line head driving apparatus comprising:

indicating means for indicating an increase or decrease in an image density in a sub scan direction; and correcting means for setting an electrical energy level to be applied to the thermal elements to be greater than that indicated by said multilevel image data supplied from said preprocessing circuit when said indicating means indicates an increase in an image density in a sub scan direction perpendicular to said main scan direction and for setting the electrical energy level to be applied to the thermal elements to be less than that indicated by said multilevel image data supplied from said preprocessing circuit when said indicating means indicates a decrease in the image density in said sub scan direction; and head driving means, coupled to said correcting means, for driving said thermal elements in accordance with said electrical energy level set by said correcting means.

2. A line head driving apparatus as claimed in claim 1, wherein:

said correcting means comprises means for calculating a heat storage state of each of said thermal elements on the basis of the multilevel image data related to peripheral dots which are located at a periphery of a dot of interest; and said correcting means sets the electrical energy level to be applied to each of the thermal elements on a basis of said heat storage state of each of the thermal elements.

3. A line head driving apparatus as claimed in claim 1, wherein said correcting means comprises:

calculating means for calculating an average electrical energy level applied to each of said thermal elements within a range corresponding to a predetermined number of lines of a dot image formed by said thermal head and for outputting data indicative of said average electrical energy level;

subtracter means, coupled to said calculating means, for subtracting said data indicative of said average electrical energy level from said multilevel image data supplied from said preprocessing circuit and for outputting correction data; and correction means for correcting said multilevel image data supplied from said preprocessing circuit on the basis of said correction data.

4. A line head driving apparatus as claimed in claim 3, wherein said correction means comprises a memory which stores corrected multilevel image data based on said correction data and said multilevel image data supplied from said preprocessing circuit, and said corrected multilevel image data is applied to said thermal head.

5. A line head driving apparatus as claimed in claim 4, wherein said memory is a read only memory.

6. A line head driving apparatus as claimed in claim 3, wherein said calculating means comprises a first line memory, a second line memory, an adder, a first multiplier, a second multiplier and a calculator, and wherein:

said first line memory receives said multilevel image data supplied from said preprocessing circuit and delays the same by one line;

said adder receives the multilevel image signal from said first line memory and a multiplied result output by said second multiplier and outputs an addition result;

said first multiplier multiplies said addition result output by said adder by 1/A where A is an arbitrary constant and outputs said data indicative of the average electrical energy level;

said second line memory receives said data from said first multiplier and delays the same by one line;

said calculator calculates a heat storage state of each of said thermal elements on the basis of the data which are supplied from said second line memory and which are related to peripheral dots located at a periphery of a dot of interest and outputs a calculation result; and said second multiplier multiplies said calculation result output by said calculator by (A−1) and outputs said multiplied result supplied to said adder.

7. A line head driving apparatus as claimed in claim 6, wherein said predetermined constant A corresponds to said predetermined number of lines.

8. A line head driving apparatus as claimed in 6, wherein said calculator comprises means for weighting said data related to the peripheral dots to thereby generate weighted data and for adding weighted data related to said peripheral dots to thereby generate said calculation result.

9. A line head driving apparatus as claimed in claim 6, wherein said first multiplier comprises a read only memory which receives, as an address signal, said addition result and which outputs said data indicative of said electrical energy level based on the addition result.

10. A line head driving apparatus as claimed in claim 6, wherein:

said second line memory comprises a first line memory portion and a second line memory portion; and said first line memory portion and said second line memory portion are alternately switched so that said first line memory portion is connected to said calculator when said second line memory portion is connected to said first multiplier and that said second line memory portion is connected to said calculator when said first line memory portion is connected to said first multiplier.

11. A line head driving apparatus as claimed in claim 3, wherein said calculating means comprises, an adder, a line memory, a first multiplier, a second multiplier and a calculator; and wherein:

said adder adds said multilevel image data supplied from said preprocessing circuit and a multiplied result supplied from said second multiplier and outputs an addition result;

said line memory receives said addition result and delays the same by one line;

said first multiplier multiplies said addition result supplied from said line memory by 1/A where A is an arbitrary number and outputs said data to be supplied to said subtracter means;

said calculator calculates a heat storage state of each of said thermal elements on the basis of the data which are supplied from said line memory and which are related to peripheral dots located at a periphery of a dot of interest and outputs a calculation result; and said second multiplier multiplies said calculation result output by said calculator by (A−1) and outputs said multiplied result.

12. A line head driving apparatus as claimed in claim 11, wherein said predetermined constant A corresponds to said predetermined number of lines.

13. A line head driving apparatus as claimed in 11, wherein said calculator comprises means for weighting said data related to the peripheral dots to thereby generate weighted data and for adding weighted data related to the peripheral dots to thereby generate said calculation result.

14. A line head driving apparatus as claimed in claim 11, wherein said first multiplier comprises a read only memory which receives, as an address signal, said addition result and outputs said data indicative of said electrical energy level based on the addition result.

15. A line head driving apparatus as claimed in claim 1, wherein said preprocessing circuit comprises a gamma correction circuit.

16. A line head driving apparatus as claimed in claim 1, wherein said electrical energy level corresponds to a gradation level of the image.

* * * * *